March 31, 1959  S. A. SCHMIDT ET AL  2,880,380
METER MOUNTING

Filed Nov. 23, 1955  6 Sheets-Sheet 1

Inventors:
Stanley A. Schmidt
Francis H. Hardy
by, Richard E. Hosley
Their Attorney March 31, 1959

S. A. SCHMIDT ET AL 2,880,380

METER MOUNTING

Filed Nov. 23, 1955

Inventors:
Stanley A. Schmidt
Francis H. Hardy
by, Richard E. Hosley
Their Attorney March 31, 1959 S. A. SCHMIDT ET AL 2,880,380
METER MOUNTING
Filed Nov. 23, 1955 6 Sheets-Sheet 3

Inventors:
Stanley A. Schmidt
Francis H. Hardy
by, Richard E. Holey
Their Attorney March 31, 1959  S. A. SCHMIDT ET AL  2,880,380
METER MOUNTING
Filed Nov. 23, 1955  6 Sheets—Sheet 4
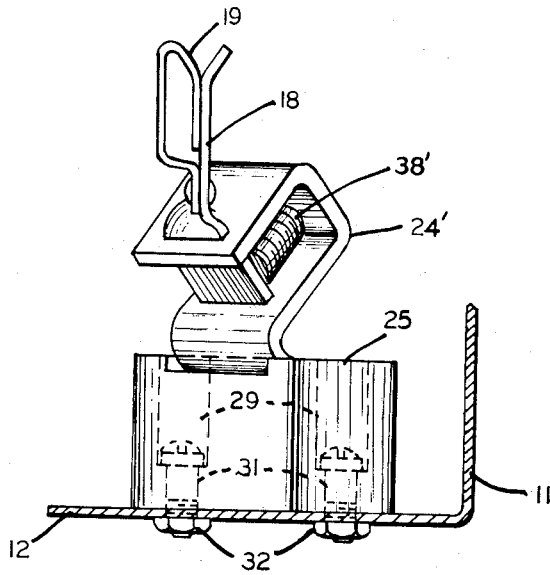
Fig. 9
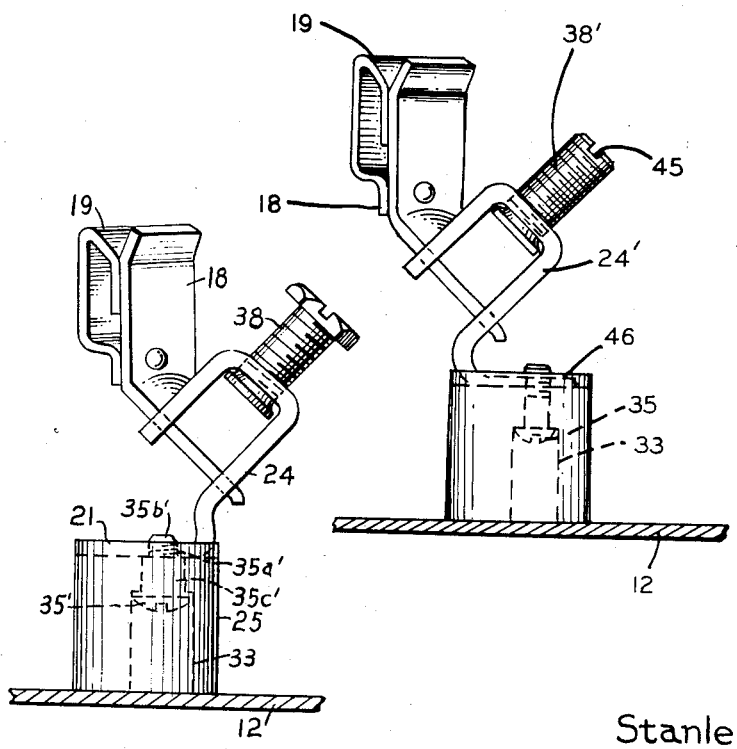
Fig. 10
Fig. 11
Inventors:
Stanley A. Schmidt
Francis H. Hardy
by, Richard E. Hosley
Their Attorney March 31, 1959 S. A. SCHMIDT ET AL 2,880,380
METER MOUNTING Filed Nov. 23, 1955 6 Sheets-Sheet 5

Inventors:
Stanley A. Schmidt
Francis H. Hardy
by, Richard E. Hosley
Their Attorney March 31, 1959  S. A. SCHMIDT ET AL  2,880,380
METER MOUNTING Filed Nov. 23, 1955  6 Sheets-Sheet 6

Inventors:
Stanley A. Schmidt
Francis H. Hardy
by, Richard E. Harley
Their Attorney United States Patent Office 2,880,380
Patented Mar. 31, 1959

2,880,380

METER MOUNTING

Stanley A. Schmidt and Francis H. Hardy, Lynn, Mass., assignors to General Electric Company, a corporation of New York Application November 23, 1955, Serial No. 548,830

2 Claims. (Cl. 317—109)

This invention relates generally to a meter mounting and, in particular, to improvements in such a mounting for a detachable plug-in meter of the induction watthour type.

This application is a continuation-in-part of application Serial Number 465,381, filed October 28, 1954, and assigned to the same assignee as the instant application, and now abandoned.

Most watthour meter mountings in use today utilize some form of receptacle having an open side for receiving therein a plug-in watthour meter. Such meters usually have upper and lower pairs of contact blades projecting from the back side thereof, and the receptacle is usually provided with blade receiving members cooperating with the projecting blades to make the necessary electrical connections between the service line, meter, and load. The coaction between these parts also serves to assist in retaining the meter in place in the meter mounting. Normally, it is desirable to make the receptacle readily adaptable to at least two mounting positions, and ordinarily these positions are either horizontal or vertical. Moreover, it is customary to maintain a predetermined orientation of the watthour meter, usually a vertical position, and the meter mounting must be provided with suitable arrangements to retain this predetermined orientation of the meter for any position of the receptacle.

Receptacles heretofore used have proved to be adequate for the magnitude of load current being handled, but with a continuation of the present trend to higher and higher magnitudes of load current being handled by watthour meters, it has been found that improvements are desirable to the existing mounting structures. Thus, with higher currents being handled, it is necessary to use heavier and larger electrical lead wire, and such wire serves to complicate the wiring and installation of the meter mounts. Not only is the wire more difficult to handle, but heavy duty parts must be utilized, particularly in view of the contemplated meter loads as high as 100 amperes. Moreover, the problem is further complicated by having to provide meter mounts adaptable for two mounting positions.

Accordingly, it is an object of this invention to provide an improved meter mount of the type described, wherein the connection of wires and installation of the mount is greatly simplified over existing devices.

It is another object of the invention to provide an improved meter mount of the type described, wherein optimum use is made of identical parts to thereby provide for greater economy of manufacture. It is a still further object to eliminate all superfluous parts in such meter mounts, to thereby further enhance the economical manufacture thereof.

The above objects, and others are met by the use of novel mounting means for the blade receiving members wherein a 45 degree orientation of such mounting means materially facilitates the installation and use of the meter mount.

In addition, several forms of blade receiving members have been devised which are novel in themselves, and which further serve to facilitate installation and use of the meter mount.

By proper forming and positioning of the blade receiving members, and by proper correlation of the design of the blade receiving members to the form and position of their associated mounting means, an arrangement is achieved permitting conversion of the mounting position of the meter receptacle by simply exchanging the position of individual blade receiving members in the upper and lower pairs provided, either with or without their associated mounting means. Moreover, in some forms of the invention, any preselected blade receiving member can be positioned completely out of contact with its corresponding meter blade by simply reversing its position in its own mounting means.

Of added significance is the fact that all adjustments for normal connection of leads and installation of the device can be done from the front of the receptacle, easily and conveniently, and without the necessity of changing or removing any parts that are permanently affixed to the receptacle. Additionally, heavy duty, interchangeable parts have been used throughout to combine ruggedness and long life with economical manufacturing techniques.

The invention will be best understood upon reference to the detailed description set forth below, particularly when taken in conjunction with the drawings annexed hereto, in which:

Figure 1 is a top view of a meter mount and associated plug-in watthour meter, arranged for vertical orientation of the meter, with a part of the wall of the receptacle cut away to show one of the blade receiving members mounted in position for receiving its corresponding meter blade and the other of the blade receiving members mounted in position out of contact with its corresponding meter blade, the receptacle in this instance being mounted for connection with lead wires coming in from the top and bottom sides of the mounting;

Figure 1:
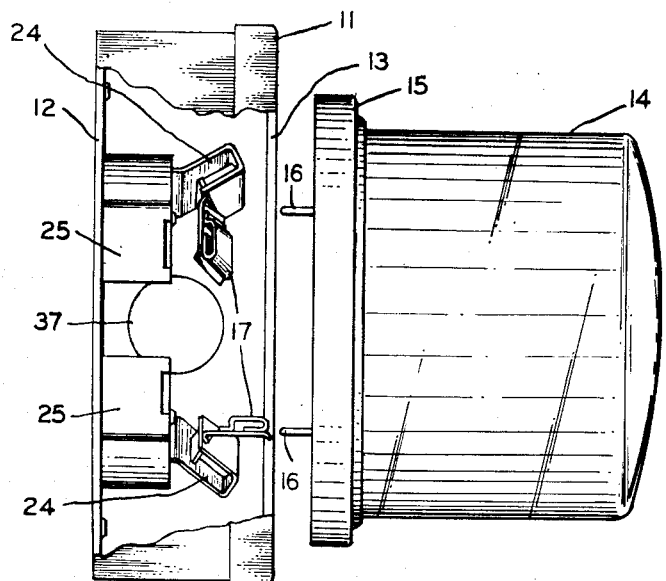
Figure 2:
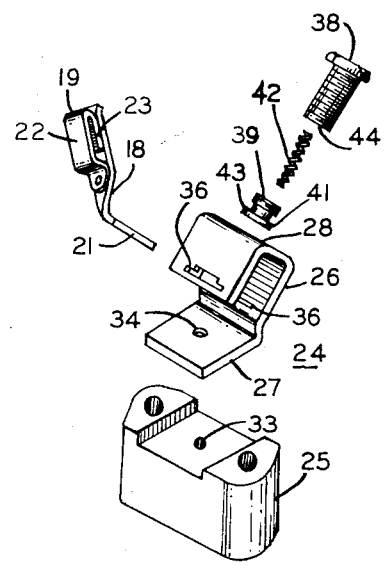
Figure 2 is is an exploded perspective view of a blade receiving member and associated mounting means of the type shown in Figure 1.
Figure 3:
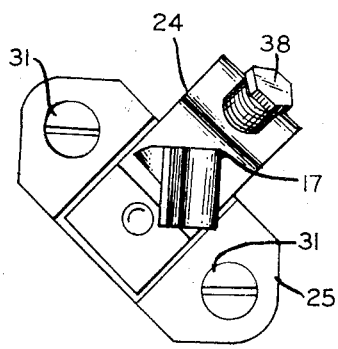
Figure 3 is an enlarged top view of the blade receiving member shown in Figure 2 as it looks when in place on its associated mounting structure.
Figure 4:
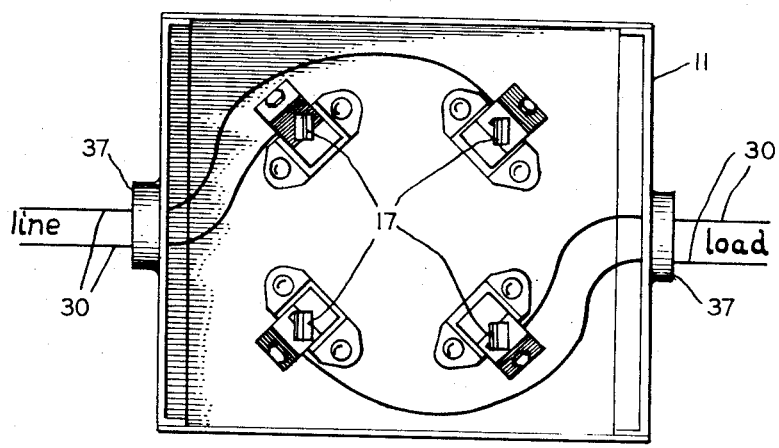
Figure 4 is a front view of the receptacle shown in Figure 1, when mounted in a horizontal position, showing schematically the manner in which the external lead wires are brought into the meter mount.
Figure 5:
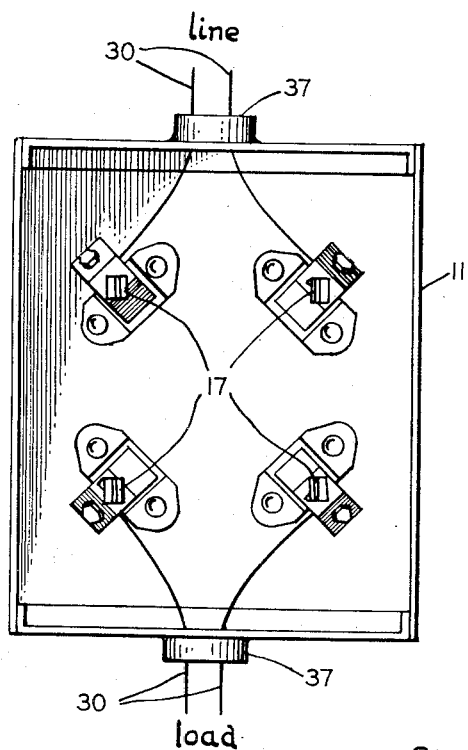
Figure 6:
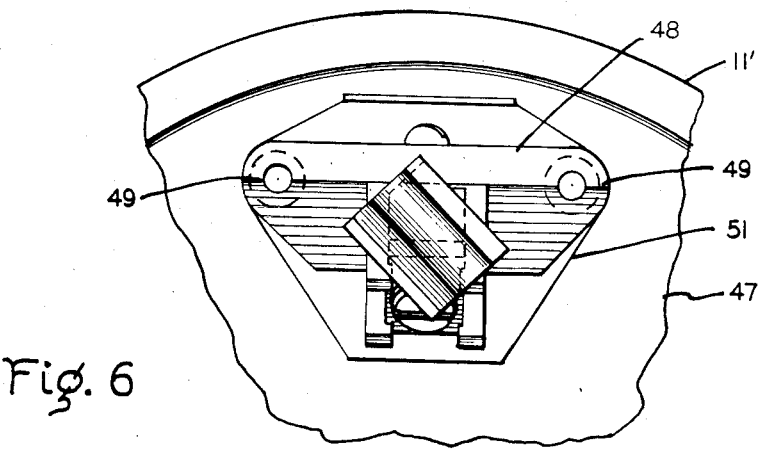
Figure 7:
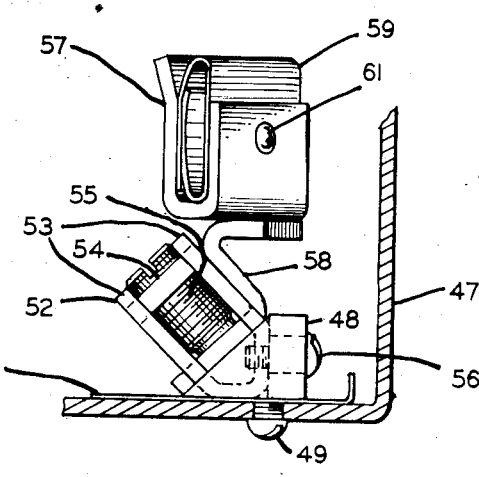
Figure 8:
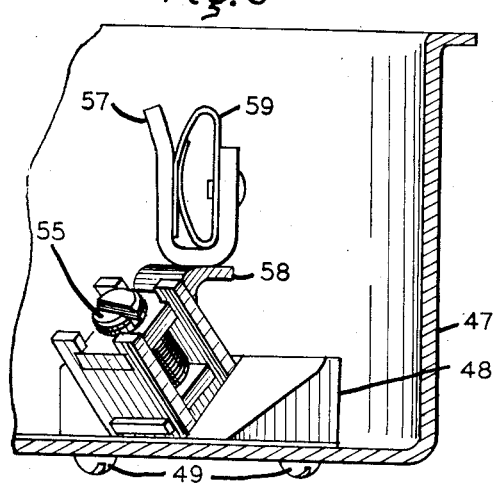
Figure 12:
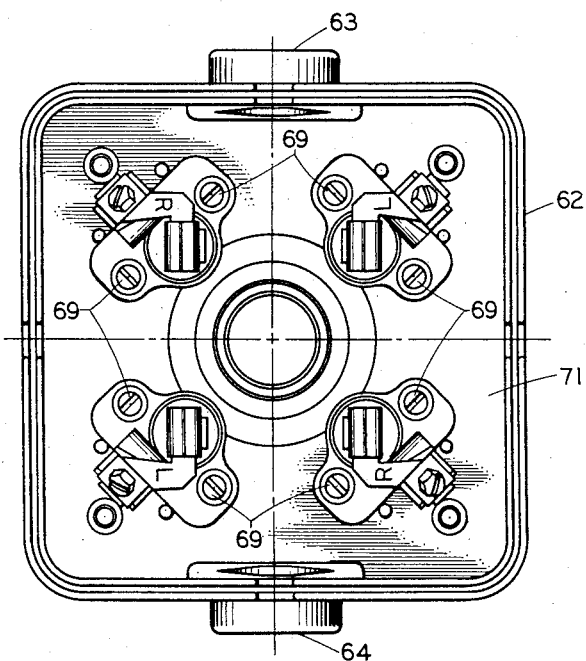
Figure 13:
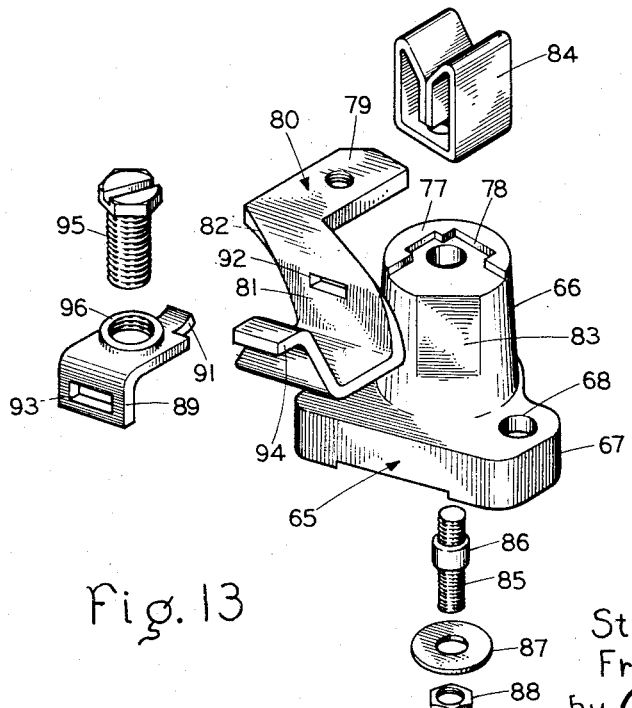
Figure 14:
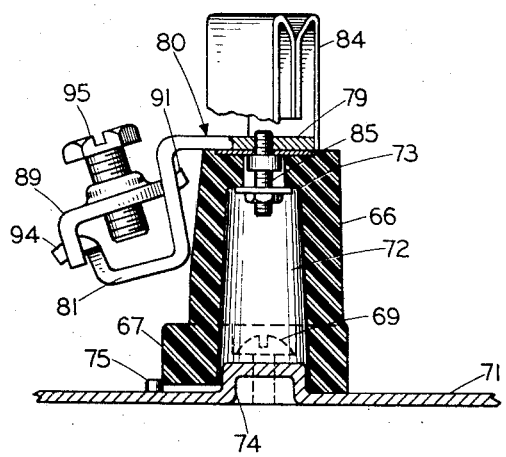
Figure 15:
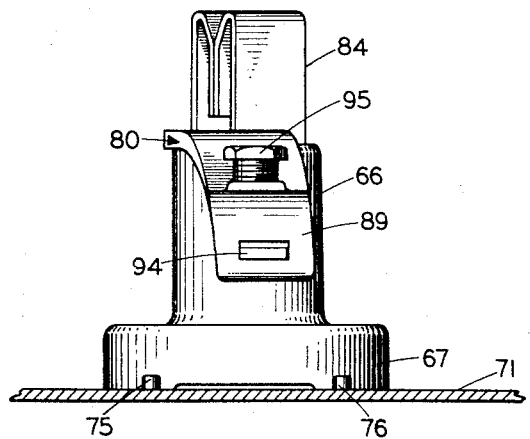

Figure 5 is a front view of the receptacle shown in Figure 4 when mounted in a vertical position, showing a mounting arrangement for the blade receiving members similar to the arrangement shown in Figure 4, to thereby illustrate how the receptacle provides for a predetermined orientation of an associated plug-in meter for either a horizontal or vertical position of the receptacle; also, there is shown schematically the manner in which the external lead wires are brought in;

Figure 6 is an enlarged top view of a modified form of the blade receiving member, illustrating another embodiment of the invention as used in connection with a round receptacle, a portion of which is shown;

Figure 7 is an enlarged end view of the embodiment shown in Figure 6;

Figure 8 is another enlarged view of the embodiment shown in Figure 6, showing an end view of the resilient jaws;

Figure 9 is an enlarged view, similar to Figure 8, showing still another embodiment of the invention; and Figure 10 is another enlarged view of the embodiment shown in Figure 9, showing a view similar to the view shown in Figure 7;

Figure 11 is an enlarged view similar to the view shown in Figure 10 of the embodiment shown in Figures 1, 2 and 3 and in which the floating mounting of the yoke is illustrated;

Figure 12 is a view similar to Figure 5 of another embodiment of the invention;

Figure 13 is an exploded view of the blade receiving member shown in Figure 12, also showing its associated terminal and mounting structure;

Figure 14 is an end view, partly in section, of the blade receiving member and its associated terminal and mounting structure, showing it as mounted in the back plate of the receptacle shown in Figure 12, and;

Figure 15 is a side view of the arrangement shown in Figure 14.

Referring to Figure 1, there is shown one form of a meter mounting of the type utilizing a box-like receptacle 11 having a rear wall 12 and an open side 13 opposite the rear wall for receiving a plug-in meter of the induction watthour type. In the embodiment shown the front wall of the meter mount may have depending flanges 10 overlying the side walls of the receptacle and the open side 13 will be in the form of an annular opening in the front wall.

The meter is of the conventional type wherein its working parts are enclosed by a suitable glass cover 14 carried by an annular base member 15 from which extend outwardly the meter terminals in the form of upper and lower projecting contact blades 16. These blades are adapted to be plugged into suitable blade receiving members affixed within the meter mounting 11 and with the vertical aligned blade arrangement shown, the conventional vertical orientation of the meter is obtained. The meter will be inserted into the aforesaid annular opening 13 and retained in place by suitable arrangements well known in the art. The coaction between blades 16 and corresponding blade receiving members will assist in retaining the meter in place.

The blade receiving members are generally indicated at 17 and in one embodiment thereof comprise a twisted conducting strap 18 having an outer resilient jaw portion 19 and an inner conducting strap portion 21. The resilient jaw portion is formed by affixing to the outer portion of the strap a resilient member in the form of a spring clip 22. The clip 22 may be secured to the strap by rivets or other suitable means, and the parts are designed such that with the meter removed, the inner side 23 of the clip engages the inner surface of the outer portion of strap 18. When the meter is plugged in to its corresponding mounting, the contact blades 16 force the resilient jaws apart so that the blades are firmly and securely held in place once the meter has been properly plugged in. The meter blades firmly abut the inner surface of the strap 18 to provide excellent electrical contact therewith to complete the necessary circuit connections to the internal working parts of the meter.

In the normal arrangement of the blade receiving members 17, all of the jaw portions are parallel and are aligned to correspond vertically with the alignment of the cooperating meter contact blades 16.

The receptacle 11 also includes mounting means for the blade receiving members, and these mounting means include the yoke members 24 and the insulating base members 25. In the embodiment illustrated in Figures 1, 2, 3, and 11, it is seen that the yoke member 24 includes a U-shaped portion having its side legs 26 disposed at an angle of 45 degrees with respect to the mounting extension 27, and this angular disposition places the base 28 of the yoke at an angle of 45 degrees with respect to the rear wall 12 so that the base faces substantially outwardly toward the open side of the meter mounting.

As is best shown in Figures 9, 10 and 11, the insulating block 25 is provided with a pair of counter-sunk apertures 29 for receiving therein suitable fastening means in the form of the threaded bolts 31 extending through suitable apertures provided in the rear wall 12. These bolts cooperate with suitable nuts 32 to hold the blocks 25 in place.

The base member 25 is also provided with a centrally located counter-sunk aperture 33 opening into the face of the recess provided in the top surface thereof, and this aperture is aligned with an aperture 34 provided in the mounting extension of the yoke 24. Both aperture 33 and 34 may be threaded to cooperate with a suitable fastening means in the form of the threaded bolt 35 so that the yoke can be securely attached to the insulating block 25.

In both of the above arrangements, threaded bolts cooperating with threaded nuts or the like are shown as the means to fasten the parts together, but it is to be understood that other equivalent fastening means could be utilized. Although the yoke mounting extension 27 is shown securely attached to the insulating block 25 it may be preferable to have this member floating on the block 25 in such a way that the yoke can move slightly to compensate for minute dimensional deviations within permissible manufacturing tolerances. Such tolerances may result in misalignment between the blades 16 and blade receiving members 17 should the yoke 24 be fixed in position, and for this reason the floating arrangements may be utilized. One way of achieving this floating action is illustrated in Figure 11 wherein the bolt 35' has been used in place of the bolt 35 shown in Figure 10. Bolt 35 is provided with a shoulder $35a'$ proximate to its threaded extremity $35b'$ and this shoulder is spaced from the head of the bolt by a shank portion $35c'$. This shank is slightly longer than the aperture in block 25 through which it extends so that a slight clearance exists between the head of bolt 35 and the counter-sunk shoulder in the block when the yoke member has been drawn tightly onto the bolt. In this way the yoke is clamped to the bolt rather than to the block and proper dimensioning of the parts gives a so-called "floating" mounting of the yoke and allows the yoke to position itself slightly so that its blade receiving members 17 cooperate with the protruding blades of an associated watthour meter.

The legs 26 are oppositely slotted at 36 to receive therein the inner strap portion 21 of the twisted member 18. In the embodiment shown the outer part of strap portion 21 is slightly undercut on both edges thereof to match the width of the slots 36 so that a shoulder is formed by the undercutting to rest on the outer surface of the upper leg 36. It is seen that with this construction the blade receiving member 17 slidably and detachably engages the yoke 24.

When the blade receiving member is in place on the yoke 24 it is noted that the two parts together form a terminal lead socket, into which may be inserted a suitable external lead wire. Such wires are normally brought into the receptacle 11 through suitable apertures provided in its end walls, being indicated in the drawings as 37.

Referring to Figures 4 and 5, it is to be observed that all of the yokes are mounted such that their base portions 28 face outwardly and any one yoke member has its side legs perpendicular to the side legs of adjacent yoke members. Considering the arrangement of Figure 5, the external lead wires 30 are brought into the terminal sockets through the upper and lower openings 37. Such leads may have conducting wires on the order of one-quarter inch in diameter with an overall diameter of one-half inch or more and are thus quite heavy and stiff. The arrangement of the terminal sockets materially enhances the wiring of meter mounts with such large size wires and in the case of the arrangement of Figure 5, all terminal sockets face toward the openings 37 to accommodate either "bus line" wiring or other wiring arrangements. The use of such heavy conductors makes "bus line" type wiring almost essential for any degree of facility and the terminal socket provided is readily adapted to such a method of wiring. Thus, the wires 30 can be pushed through the openings 37 until their bare ends are opposite the terminal sockets. The blade receiving members 17 can be removed from the terminal sockets, leaving the terminal socket open in the form of a U-shaped member. The open side of the socket faces the bare end of the lead wire, and it is necessary to merely move the wire sideways into the socket after which the blade receiving member is returned to its proper position on the yoke to help retain the lead in the socket. In the event that the lead wire is sufficiently flexible, it can be conveniently pushed into the socket through the open end thereof facing the aperture 37. In either form of wiring it is thus apparent that connections to the meter mount are materially simplified.

In a like manner, when the horizontal arrangement of Figure 4 is used, the mode of wiring for either "bus line" type of connection or otherwise is the same as in the vertical arrangement. In other words, the angular position of the sockets and the manner of constructing them and mounting them within the receptacle 11 permits maximum ease of wiring for heavy or light conductors in either a vertical or horizontal mounting position of the meter mount.

Referring once again to Figure 2, it is to be noted that each socket is provided with a clamping member in the form of a terminal screw 38 extending through a suitable threaded aperture provided in the base portion 28 of yoke 24. In the form shown, this terminal screw is not a solid member but has a hollow bore, the end portion of which is threaded to cooperate with the threaded portion 39 of the contact member 41. Normally the spring 42 is also provided within the bore of terminal screw 38 and the usual assembly of parts contemplates screwing the contact member 41 into the bore of terminal 38 for a sufficient distance to allow the threaded portion 39 to clear the internal threads. The parts are designed for a lead wire having a diameter sufficiently large to normally move the contact member 41 into the bore to thereby compress the spring 42 when all of the parts are assembled into place. In other words, with the lead wire inserted into the socket defined by the yoke 24 and the strap 21, the terminal screw assembly of 38, 42, 41 is tightened in place until such time as the outer face of end 41 firmly engages the lead wire. This will force the end 41 within the terminal screw until the inner face 43 abuts the terminal outer edge 44. In this position the spring 42 will be under a considerable compression force, and should there be any cold flow of the lead wire during use, the energy stored in the spring 42 will serve to retain the clamping action on the lead wire at all times.

It is to be noted that the terminal screw 38 is easily manipulable from the open side of the meter mounting to further facilitate installation and connection of the lead wires. Although the terminal screw 38 is shown with a conventional hexhead, it could be provided with a transverse slot of the type shown in Figures 6 through 10 inclusively. Additionally, for those installations wherein cold flow of the lead wire is no problem, the terminal screw 38 could be a solid member.

In forming the twisted strap member 18, it is to be noted that the strap is disposed at an initial 45 degree angle from the rear wall 12 by virtue of the yoke arrangement and the manner in which it cooperates therewith. The outer portion 19 is bent through an additional angle of 45 degrees, which then has the effect of making this portion perpendicular to the rear wall. The only problem remaining is to twist the outer portion through the required angle to have the jaws aligned vertically for cooperation with the vertical alignment of the contact blades on the plug-in meter.

Referring to Figure 3, which is an enlarged view of the blade receiving member located in the upper right hand corner of the receptacle shown in Figure 5, the configuration of member 18 therein has, for convenience sake, been designated as having a right hand twist, which means that after the first 45 degrees bend is made in strap 18, which has the effect of making the outer portion 19 perpendicular to the rear wall, a further twist is achieved by bending the outer portion to the right or in a clockwise direction through an angle of 45 degrees. It will be understood that a so-called right hand blade receiving member will also be used in the lower left hand corner of the arrangement shown in Figure 5.

To form the strap 18 for use with the yoke mounted in the upper left and lower right hand corners of the receptacle shown in Figure 5, the second twist given to the strap 18 is to the left in a counterclockwise direction through an angle of 45 degrees. In other words, the right hand and left hand parts are identical save for the second twist given each, which has the effect of displacing the outer ends at an angle of 90 degrees with respect to one another.

It will thus be apparent that in any receptacle there is provided a pair of right hand blade receiving members and a pair of left hand blade receiving members, one of each being mounted in the upper pair of yokes and the lower pair of yokes, respectively, and with like members diametrically disposed with respect to one another.

Once again referring to Figures 4 and 5, and assuming that the receptacle is initially assembled as shown in Figure 5, it is noted that such an arrangement provides for a vertical mounting of the receptacle, and the blade receiving members are aligned vertically to receive the vertically aligned contact blades of a plug-in meter. Assuming that the meter mount leaves the factory in the condition shown in Figure 5, and assuming further that it is desired to mount the receptacle in a horizontal position as shown in Figure 4, rather than the vertical position shown in Figure 5, it is a simple matter to convert the receptacle to the horizontal mounting position by merely changing the position of the individual blade receiving members in the upper and lower pairs. That is, referring particularly to Figure 5, the upper right hand blade receiving member is moved over to the position normally occupied by the left hand blade receiving member and vice-versa. The same thing happens to the lower pair, and in this way when the receptacle is rotated counterclockwise through an angle of 90 degrees, the jaw portions are still aligned vertically so as to retain the same orientation of the plug-in meter.

Moreover, the same effect could be produced by exchanging the upper right member 17 with the lower right member 17 and making a similar change in the left column of blade receiving members, and any reference to switching the position of individual blade receiving members includes either of the aforementioned modes of exchange.

In addition to providing simple and effective conversion of the meter mount, the blade receiving members and associated mounting means have been formed to permit selective disengagement of a blade receiving member from its normally cooperating contact blade as desired without permanently removing the blade receiving member from the receptacle. This is done quite simply by merely removing the blade receiving member from its associated yoke, turning it through an angle of 180 degrees, and re-inserting it back into the yoke. This will have an effect of making the jaw portion parallel to the rear wall rather than perpendicular thereto, and instead of extending outwardly to cooperate with the inwardly extending contact blade on the plug-in meter, it will be completely out of contact with the blade. This will have the effect of providing an open circuit between any two such parts. Thus, the design is such that any preselected blade receiving member can have three mounting positions, one position for a vertical mounting of the receptacle, a second for a horizontal mounting of the receptacle, and a third position for an open circuit between it and its normally cooperating contact blade. The arrangement of Figure 1 clearly shows this open circuit arrangement of the top one of the members 17.

Again referring back to Figure 2, it will be seen that the arrangement of the yoke is such that the aperture 34 is roughly in line with the center axis of the outer jaw portion of blade receiving member 17. The aforesaid alignment, which has the effect of aligning the screw 35 along the axis of blade receiving member 17, has the effect of reducing to a minimum any tendency for the development of objectionable leverage or moment on the yoke member and its mounting means when the meter is selectively plugged in or removed. Furthermore, it is a rather simple form of yoke to manufacture, and in the event that it is ever contemplated to secure the yoke to the insulation member 25 by some form of riveting operation or the like, the design is such as to permit ease of riveting.

In Figures 6, 7 and 8, another form of the invention is shown wherein the design has been modified to adapt it for use in connection with a round receptacle rather than the box-type shown in Figure 1. Such round-type receptacles are normally of less depth than the box type, and the design of Figures 6 through 8 provides for a more compact arrangement of the parts.

Referring first to Figure 6, there is shown a portion of a round receptacle 47 having an insulating block 48 mounted thereon by means of a pair of screws 49 extending through suitable apertures in the rear wall of the receptacle and cooperating with suitable threaded apertures provided in the block 48. An insulating shield in the form of a large piece of sheet fiber 51 is also provided, held in place underneath the member 48. The block 48 has its sloping section cut away to provide a triangular recess for receiving therein the inner portion of yoke 52. In this case the U-shaped portion of the yoke comprises the legs 53 and the bridging member 54, which has therein a suitable threaded aperture for receiving the threaded terminal 55. Both of the legs 53 are provided with transverse slots at their outer extremities cooperating with the bridge member 54, and this member may be removed (after removal of the screw 55) to provide a bus terminal in a manner similar to the other embodiments of the invention. The bottom portion of the yoke abuts part of the shield 51 and one of the upright walls of the recess provided in block 48, and the upright portion is provided with a suitable threaded aperture to cooperate with a screw 56 provided to retain the parts together. The screw 56 is a shouldered screw similar to bolt 35' and cooperates with the yoke and the base to provide a floating mounting of the blade receiving members. The blade receiving member is in the form of a first strap portion 57 comprising the outer resilient jaw and a second strap portion 58 which is rigidly affixed to portion 57 by means of brazing or some other similar suitable technique to thereby provide an integral assembly. As in the other embodiments of the invention, the inner portion of the strap 58 slidably and detachably engages the yoke, there being oppositely disposed slots in the legs of the yoke to receive this part of the strap 58, and the arrangement thus provides for a socket in a manner similar to the other embodiments. The outer resilient portion is formed of a heavy conducting strap shaped roughly in the form of a U and having the spring clip 59 confined within the legs of the U and affixed to the strap by means of the rivet 61 or in some other similar manner. Here again, the terminal 55 serves to clamp the lead wire within the socket, and, at the same time, it clamps the bridging portion of strap 58 therein. It is to be noted that this embodiment of the invention is not suited to the open-circuit mode of mounting of the blade receiving members. If open circuit mounting is desired, the members must be removed from the mount.

In Figures 9 and 10 there is shown an arrangement identical to the arrangement shown in Figures 2 and 3 with the exception that the terminal and the yoke are formed slightly differently. Thus, in Figures 9 and 10 the terminal 38' is in all respects similar to terminal 38, but the hexhead of terminal 38 has been replaced by the slotted head 45 to permit adjustment of the terminal with a screw driver rather than a wrench. Additionally, other formations of the terminal head may be used as desired.

The yoke 24', instead of having its mounting extension 27 underlying the twisted strap 18, is bent underneath the inner leg of the yoke to give a rather crude figure S configuration to the design.

In Figures 12 to 15, still another embodiment of the invention is shown, retaining the 45 degree orientation of the blade receiving assemblies but differing in structure from the embodiments previously described. The blade receiving members are shown mounted in a square receptacle 62 having the aligned openings 63, 64 in opposite sides thereof through which the lead wires may extend. The receptacle is shown in the vertical position with its blade receiving members mounted for vertical orientation of an associated watthour meter of the type shown in Figure 1.

In Figure 13, the details of the blade receiving member are clearly shown, comprising a mounting block 65 of suitable electrical insulating material having an upstanding pedestal portion 66 extending from a supporting base portion 67. The base portion 67 has its opposite ends provided with countersunk apertures, one of which shows in Figure 13 as 68, for receiving therein suitable screws 69 which cooperate with threaded apertures in the rear wall 71 of the receptacle to securely attach the mounting member thereto.

In Figure 14, it is noted that the pedestal has a tapered bore 72 terminating in the shoulder 73, and the open end of this bore fits over a raised section 74 provided in the wall 71 to assist in properly locating each mounting member thereon. A pair of locating pins 75, 76 are also provided in the wall 71 for each mounting member, and the pins and raised section cooperate with the mounting member to permit quick positive location on the wall 71.

The top surface of pedestal 66 is cut away, as shown in Figure 13, to provide a pair of slots 77, 78 disposed at right angles with respect to each other, arranged thereon to selectively cooperate with the extended end 79 of a conducting strap 80 having a yoke member 81 formed integral therewith and connected thereto by the bridge portion 82. The end 79 is disposed substantially at right angles with the bridge portion and the yoke 81 is twisted through an angle of 45 degrees with respect to the end. In addition, the yoke is bent inwardly toward the pedestal 66, as shown in Figure 14, the pedestal being beveled along its side, at 83, to provide clearance for the yoke.

Disposed on the end portion 79 is a jaw member 84 formed in one piece from heavy conducting strap stock, its inturned ends providing a resilient, gripping jaw for the blades of an associated watthour meter. The base of the jaw member is apertured, as is the end portion 79, the aperture in the end portion of the strap 80 being threaded to receive the end of a stud screw 85 extending upwardly from the upper, reduced portion of bore 72. The end 79 is inserted in the jaw member 84 so as to overlie its base after which the assembled parts are clamped together by means of screw 85. The screw 85 has a shoulder 86 intermediate its ends and with the screw suitably clamped in a fixed position, the jaw assembly is drawn up against this shoulder. The assembled parts are then placed on the top of pedestal 66 with the end 79 projecting into slot 78. In this position, the lower end of screw 85 extends below the shoulder 73 within the pedestal, and a washer 87 may be slipped over the end of the screw and drawn up against the shoulder 73 by means of the lock nut 88 to securely attach the jaw assembly to the pedestal.

Cooperating with the yoke 81 to form a terminal socket for an associated electrical conductor is an L-shaped strap 89 having a tongue 91 adapted to fit into slot 92 provided in one side wall of yoke 81, the strap also having a slot 93 adapted to receive tongue 94 forming the extremity of the other side wall of the yoke. Strap 89 carries a terminal screw 95 in its centrally disposed threaded aperture 96, and when these parts are in place, the blade receiving member is complete.

Normally, the strap 89, and its associated terminal screw 95, are not assembled to the yoke until the receptacle is ready for wiring, in which event the bare ends of the wire are laid in the yoke 81, after which the strap and terminal screw assembly are mounted therein. In mounting the strap and terminal screw assembly, the tongue 91 is first inserted into slot 92 after which the strap is brought downwardly toward the wire so that its slot 93 can be slid over the tongue 94. With the parts in this position, the terminal screw 95 is drawn down securely onto the wire to lock all the parts together.

In Figures 13 to 15, the yoke is shown on the right hand side of its end 79, this form of the blade receiving member being shown in Figure 12 mounted adjacent the upper left and lower right corners of the receptacle 62. The blade receiving members mounted adjacent the upper right and lower left corners of receptacle 62 are in all respects identical to the arrangement shown in Figures 13 to 15 with the exception of the yoke member which in this case lies to the left of its associated end, the end in turn extending into slot 77 when the parts are mounted on an associated pedestal. For maximum convenience, the two forms of blade receiving members may be marked "L" and "R," Figure 12 illustrating such an arrangement.

The adjacent pedestals are mounted at right angles to each other, with their major axes at an angle of 45 degrees with respect to the vertical axis of the receptacle 62. If the receptacle is to be converted for horizontal mounting, it is only necessary to remove the screws 69 and move the right hand members to the positions formerly occupied by the left hand members, and vice-versa, after which the mounting members 65 are again secured to the rear wall 71. This can be accomplished by reversing the positions of both upper and lower pairs of blade receiving members shown in Figure 12, or by moving the lower pair to the upper position and vice-versa.

From the above it will be seen that a number of important advantages are derived from the novel blade receiving members and their associated mounting means. First and foremost, the 45 degree orientation of the mounting means provides a convertible meter mount suitable for use in metering circuits where the contemplated loads will be as high as 100 amperes. The arrangement of the yokes, such that all sockets formed thereby effectively face the opening through which the external leads are brought in, materially simplifies the connection of these wires to the sockets. Additionally, "bus line" wiring of the socket is attainable to materially simplify the wiring of such mounts when large, heavy conductors are used. Moreover, the terminal screws have their heads facing outwardly such that they are readily and easily manipulable from the front of the mount without interference from any other part of the mounting structure. The angular displacement of portions of the blade receiving members permits three mounting positions (with the exception of the embodiment of Figures 6-8 and 12-15), two for the horizontal and vertical positions of the mount and one for selective open-circuiting of the members with the plug-in meter in place. The several embodiments of the invention show how it can be easily adapted to either a box or round receptacle, where different considerations of depth and compactness are met. Finally, in each embodiment of the invention, all of the blade receiving members and their associated mounting means are identical with the exception of the one part in each that is either a left hand or a right hand member; such identity promotes low manufacturing costs and simplicity of design, and the provision of both left hand and right hand parts makes conversion of the meter mounting quite simple, being readily and easily done from the front of the receptacle with a screw driver as the only tool required.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. A meter mounting for a plug-in meter of the type having upper and lower pairs of spaced projecting contact blades, comprising, in combination: a receptacle having a rear wall and an open side opposite thereto, said receptacle being adapted for mounting in either of two mutually perpendicular positions in a vertical plane, pairs of upper and lower blade receiving members within said receptacle, and individual mounting means for each of said blade receiving members, said mounting means including spaced pairs of upper and lower insulating blocks together with means associated with each block and manipulatable through said open side for removably affixing said blocks to said rear wall, all of said blocks having their major axes forming a 45-degree angle with the vertical axis of said receptacle, said blocks in said upper and lower pairs having their major axes arranged at right angles relative to one another, said blade receiving members having predetermined positions relative to said blocks, said positions being at a 45-degree angle relative to said major axes whereby said receptacle may be converted from one mounting position to another by exchanging the positions of said blocks in each of said pairs.

2. The combination defined in claim 1 wherein diagonally opposite blade receiving members and their associated mounting means are identical units and the positional angles of one pair of diagonally opposite blade receiving members relative to their associated blocks are at right angles to the corresponding positional angles of the other pair of diagonally opposite blade receiving members.

References Cited in the file of this patent
UNITED STATES PATENTS

| | | |
|---|---|---|
| 2,015,112 | Johansson | Sept. 24, 1935 |
| 2,066,300 | Mylius | Dec. 29, 1936 |
| 2,145,557 | Rypinski | Jan. 31, 1939 |
| 2,534,449 | Johansson | Dec. 19, 1950 |
| 2,538,912 | Road et al. | Jan. 23, 1951 |
| 2,598,521 | Espenschied | May 27, 1952 |
| 2,659,877 | Sheldon | Nov. 27, 1953 |